Oct. 3, 1961     A. BELLOMO     3,002,364
UNIVERSAL JOINT
Filed May 3, 1956     2 Sheets-Sheet 1
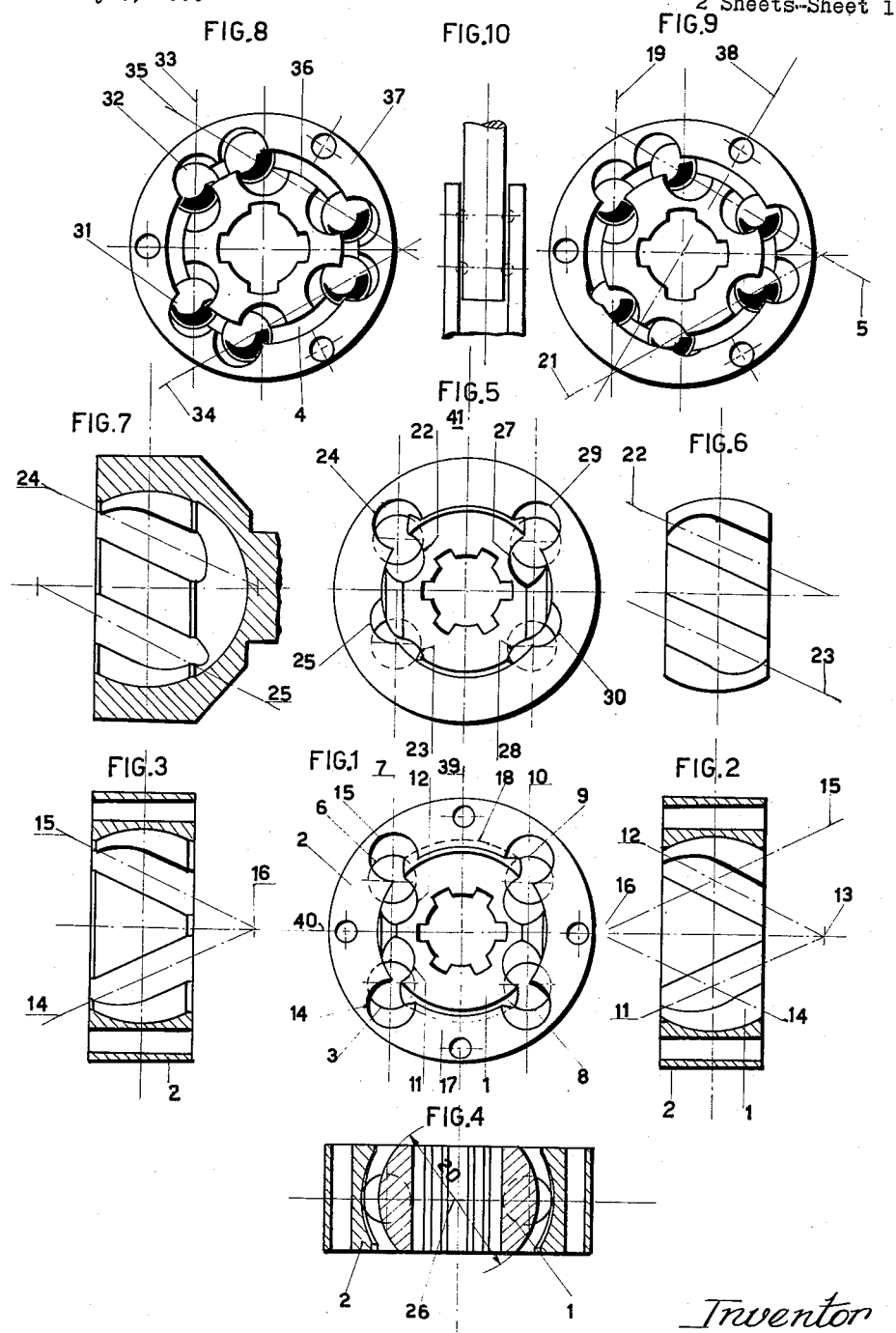
Inventor
Andrea Bellomo
By: Olson & Trexler
attys.

Oct. 3, 1961 A. BELLOMO 3,002,364
UNIVERSAL JOINT
Filed May 3, 1956 2 Sheets-Sheet 2

INVENTOR
ANDREA BELLOMO
BY Olson + Trexler
ATTORNEYS

United States Patent Office 3,002,364
Patented Oct. 3, 1961

3,002,364
UNIVERSAL JOINT
Andrea Bellomo, Via Torricelli 16, Turin, Italy
Filed May 3, 1956, Ser. No. 582,506
7 Claims. (Cl. 64—21)

The object of the present invention is to provide a homokinetic joint of the type in which the transmission between a male element and a female element is performed by means of balls which operate in the bisecting plane of the angle between the axes of the shafts, each ball being engaged by two grooves of circular cross section, one of the male element and one of the female element, which two grooves intersect symmetrically on said bisecting plane.

In comparison with the art known, the present invention provides a very economical universal joint having a fixed link centre or axially sliding on the driving balls themselves.

The invention is disclosed with reference to the accompanying drawings. FIG. 1 shows a view, according to the axis, of a four ball joint having a fixed link centre; in respect of FIG. 1, FIG. 2 is a section according to 39, FIG. 3 is a section according to 39 of female element 2 and FIG. 4 is a section according to 40. FIG. 5 is a modification of FIG. 1; in respect of FIG. 5, FIG. 6 is a side view of the male element and FIG. 7 is a section according to 41 of the female element.

FIG. 8 is a view, according to the axis, of a six ball universal and sliding joint and FIG. 9 is a modification of FIG. 8. FIG. 10 diagrammatically shows a joint that is sliding, but not capable of being placed at any angle, as obtained by joining together two joints, for instance, of the type of FIG. 8 or FIG 9.

Figure 11:
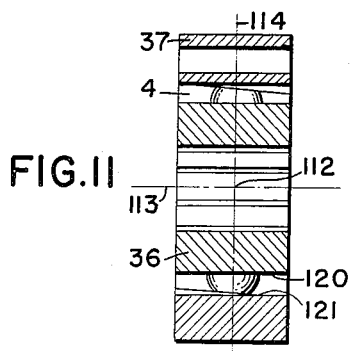
Figure 12:
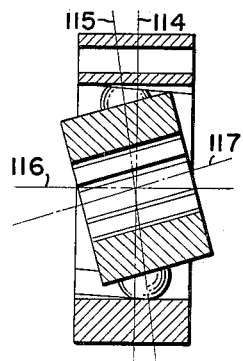
Figure 13:
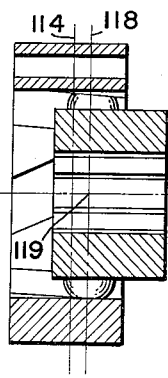
Figure 14:
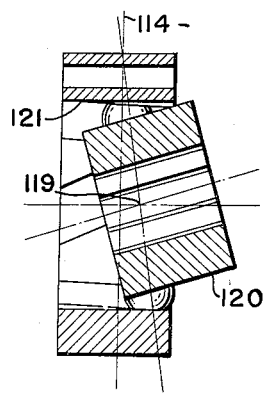

FIGS. 11 through 14 are longitudinal sections showing various positions of a joint, for example, the joint of FIGS. 8 or 9; FIG. 11 showing the male and female parts in centered position; FIG. 12, showing the joint of FIG. 11 with the parts angularly shifted; FIG. 13 showing the joint of FIG. 11 with the parts axially shifted; and FIG. 14, showing the joint of FIG. 13 with parts angularly shifted.

Figure 15:
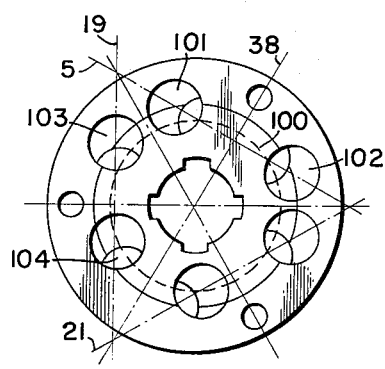

FIG. 15 shows the joint of FIG. 9 in original position for the simultaneous machining of the grooves in the male and female elements.

In FIG. 1 a male element 1 is housed in the spherical seat of female element 2 and each of the four driving balls is inserted into the crossing between a groove of male element 1 and a groove of female element 2.

According to an object of the present invention, the axes of the grooves, which engage a pair of adjacent balls such as 3 and 6 or 8 and 9, lie on a plane 7 or 10, respectively, parallel to the axis of the aligned shafts or they slightly diverge from this plane. The planes such as 7 and 10 are generally parallel between each other and symmetrical with respect to the axis of alignment of the shafts and the axes of the grooves are generally rectilinear.

According to a further object of the present invention, the axes of the four grooves of the two elements superpose each other, by turning the male or the female by 180°, with respect to the assembling position, around a transversal axis, so as to permit the simultaneous machining of the grooves on the male and on the female. For this purpose, for instance, the grooves generally coplanar of the male element 1, such as 11 and 12, on one side converge to a point 13 and the axes of the corresponding grooves of the female element, such as 14 and 15, on the other side converge to a point 16, symmetrical to 13, with respect to the plane containing the driving balls, and the same arrangement is used for the axes of the grooves in plane 10, so that, by turning the male element by 180° around the axis 26, which in FIG. 4 is orthogonal to the plane of the drawing, the axes of the grooves of the male and of the female appear to be superposed. For the same purpose, in the modification shown in FIGS. 5, 6 and 7 the axes of the grooves 22, 23, 27 and 28 of the male element are parallel between each other and they are caused to be superposed to the axes of the grooves 29, 30, 24 and 25, respectively, of the female element, which are likewise parallel between each other, by turning the male element or the female element by 180° around the transversal axis resulting from the intersection of the plane containing the balls with the plane 41 orthogonal, in FIG. 5, to the plane of the drawing.

According to a further object of the present invention, the grooves of the male element diverge from the axis in one direction and the grooves of the female element diverge from the axis in the opposite direction, as shown in FIG. 1.

From the male element or from the female element portions are removed to permit the introduction of the male element. In a four ball joint according to the present invention said cuts leave intact between the male element and the female element two opposite spherical zones of contact such as 17 and 18 shown in FIG. 1. Thus, the two elements are properly centered, since the relative radial displacements, orthogonal to planes 7 and 10, are prevented by the driving balls themselves and the relative radial displacements, parallel to planes 7 and 10, by the spherical zones 17 and 18, which also prevent the relative axial displacements of the two elements. To this end, as shown, for instance, in FIG. 4, the male element in the transverse direction is turned to have a diameter 20 which is smaller than the diameter of the mouthpiece of the female element.

FIG. 8 shows a universal and sliding joint having three or more pairs of driving balls, which also cause to reciprocally center the two elements, between male element 36 and female element 37 there being provided an annular space 4 to permit the relative axial and angular displacements between the two elements. The male element 36 may slide axially in either direction with respect to the female element 37 and during this movement is guided by the driving balls substantially rolling in their respective grooves; and further, the male element may angularly shift about a pivot point at the intersection of the plane containing the centers of the balls with the axes of the shafts to be connected, respectively, to the male and female elements.

According to an object of the present invention, already described, the axes of the grooves relating to a pair of adjacent balls, such as 31 and 32, are situated or nearly situated on a plane, such as 33, parallel to the axis of alignment of the shafts, the planes, such as 33, 34 and 35, relating to all of the pairs of adjacent balls, being generally at the same distance from the axis of alignment of the shafts and at equal angular intervals the one from the other.

According to a further object already described, the axes of the grooves of an element superpose those of the other element, by turning the male element or the female element by 180° around a transversal axis contained in a plane in which lie the balls. To this end, in FIG. 8 the axes of the grooves of the male element and the female element, respectively, lying or nearly lying on each of the planes 33, 34 and 35 are converging in a point such as 13 and such as 16, respectively, as described with reference to FIGS. 1, 2 and 3, and the overturning by 180° is to be performed around an axis orthogonal to one of said planes. For the same purpose, in FIG. 9 the axes of the two grooves of the male element and of the two grooves of the female element on each of the planes 5, 19 and 21 are parallel between each other, and for the arrangement as shown the overturning by 180° is to be performed around the axis 38 orthogonal to plane 5 and lying in the plane of the spheres.

According to a still further object already described, the grooves of the male element diverge from the axis in one direction and those of the female element diverge from the axis in the opposite direction as shown in FIG. 8. A sliding joint according to the present invention may be obtained also with four balls by using, for instance, the arrangement according to FIG. 1, but by somewhat approaching to the axis of the aligned shafts, or by moving off from this axis, the symmetric vertexes, such as 13 and 16, to center the two elements with the driving balls alone, since an annular space between the male element and the female element as shown by 4 in FIG. 8 is necessary, with the consequent suppression of the spherical zones 17 and 18 as indicated in FIG. 1.

The parts of the joint shown in FIG. 11 may be angularly shifted about the center 112 which is the intersection of the axis 113 of the aligned shafts with the plane 114 containing the centers of the driving balls. The annular space 4 permits such relative angular movement to the position, for example, of FIG. 12 wherein the balls lie along the plane 115 dividing the axis 116 of the female element and the axis 117 of the male element. In FIG. 13 the parts are shown after relative axial shifting in which the balls now lie in the plane 118 which is displaced from the plane 114 about half the relative axial displacement between the male and female elements. In FIG. 14, the joint parts are shown angularly shifted about the center 119 of FIG. 13 and this position of the joint parts may also be reached by relative axial movement between the parts from the angular displacement position of FIG. 12.

In FIG. 15, the male and female parts are shown in position for simultaneous machining of the grooves and it is to be noted that the grooves 101 and 102, lying in the plane 5, are convergent while the grooves 103 and 104, lying in the plane 19, are parallel, as are the grooves lying in the plane 21. In this position of the parts for machining, the annular space between the male and female elements is not shown but this space will result by turning the male element down to the diameter 100.

According to a further object of the present invention, in a joint of the type described with reference to FIGS. 1 to 9 the male element may be guided by the female element with a cylindrical coupling, so as to permit axial but not angular displacements, to achieve a sliding joint or baladeur joint having a small resistance to sliding. For this purpose, even two or more joints of the types described may be employed with only one male element and only one female element as diagrammatically shown in FIG. 10 for two planes of balls, and in this case the male element and the female element may be axially guided by said driving balls themselves.

What I claim is:
1. A homokinetic universal and sliding joint comprising male and female elements, a plurality of driving balls disposed between the male and female elements to effect the driving connection and the centering therebetween, each ball being engaged by two crossed grooves, one of which being on the male element and the other of which being on the female element, and an annular space between the male and female elements to permit relative axial and angular displacements between the elements.

2. A homokinetic universal and sliding joint as claimed in claim 1, wherein the axes of the grooves in the male element overlap the axes of the grooves in the female element upon relative turning of one of the elements through 180° from the assembled position, so as to permit the common machining of the male and female grooves.

3. A homokinetic universal joint comprising male and female elements, a plurality of driving balls disposed between the male and female elements to effect the drive connection therebetween, each ball being engaged by two crossed grooves, one of which being on the male element and the other of which being on the female element, the axes of the grooves in the male element overlapping the axes of the grooves in the female element upon relative turning of one of the elements through 180° from the assembled position, the direction of circumferential inclination of one or more grooves of each element being opposite to that of the other grooves of the same element.

4. A homokinetic universal joint as claimed in claim 3, wherein the axes of the grooves of the male element diverge from the axis of alignment of the shafts in one axial direction and the axes of the grooves of the female element diverge from the said axis in the opposite axial direction.

5. A homokinetic universal joint as claimed in claim 3, wherein the axes of the four grooves of an adjacent pair of balls lie in a common plane.

6. A homokinetic universal joint as claimed in claim 3, wherein there are provided spherical zones of contact between the internal surface of the female element and the external surface of the male element to prevent relative axial displacements therebetween without interfering with relative angular displacements therebetween.

7. A four ball homokinetic universal joint as claimed in claim 3, wherein there are provided two spherical zones of contact between the male and female elements, said spherical zones being opposed to one another with respect to a transverse axis.

References Cited in the file of this patent

UNITED STATES PATENTS

| | | |
|---|---|---|
| 1,774,578 | Weiss | Sept. 2, 1930 |
| 2,047,660 | Anderson | July 14, 1936 |
| 2,182,455 | Smith | Dec. 5, 1939 |
| 2,321,448 | Anderson | June 8, 1943 |
| 2,322,570 | Dodge | June 22, 1943 |
| 2,325,460 | Amberg | July 27, 1943 |
| 2,579,356 | Anderson | Dec. 18, 1951 |